US009499673B2

(12) United States Patent
Grodnensky

(10) Patent No.: US 9,499,673 B2
(45) Date of Patent: Nov. 22, 2016

(54) METHOD AND APPARATUS FOR PRODUCING A NANOCOMPOSITE MATERIAL REINFORCED BY UNIDIRECTIONALLY ORIENTED PRE-DISPERSED ALUMINA NANOFIBERS

(71) Applicant: ANF Technology Limited, Warlingham, Surrey (GB)

(72) Inventor: Ilya Grodnensky, Foster City, CA (US)

(73) Assignee: ANF Technology Limited, Warlingham (GB)

( * ) Notice: Subject to any disclaimer, the term of this patent is extended or adjusted under 35 U.S.C. 154(b) by 343 days.

(21) Appl. No.: 13/952,661

(22) Filed: Jul. 28, 2013

(65) Prior Publication Data
US 2015/0031816 A1    Jan. 29, 2015

(51) Int. Cl.
    C08K 7/02      (2006.01)
    C08K 7/08      (2006.01)
    C08J 3/20      (2006.01)
    C08J 3/28      (2006.01)
    B29C 70/14     (2006.01)
    B29K 105/12    (2006.01)
    B82Y 30/00     (2011.01)
    B29C 35/08     (2006.01)

(52) U.S. Cl.
    CPC .................. C08J 3/20 (2013.01); B29C 70/14 (2013.01); C08J 3/28 (2013.01); C08K 7/08 (2013.01); B29C 2035/0827 (2013.01); B29C 2035/0877 (2013.01); B29K 2105/124 (2013.01); B82Y 30/00 (2013.01)

(58) Field of Classification Search
    CPC .................................. C08K 7/02; C08K 7/08
    See application file for complete search history.

(56) References Cited

U.S. PATENT DOCUMENTS

| 5,350,221 A * | 9/1994 | Pearce et al. ................. 301/104 |
| 2003/0059742 A1* | 3/2003 | Webster et al. ............ 433/201.1 |

(Continued)

FOREIGN PATENT DOCUMENTS

| EP | 1818358 A1 * | 8/2007 | |
| SU | 425788 A * | 10/1974 | ............... B27K 3/10 |

OTHER PUBLICATIONS

Derwent Abstract of SU 425788 (Acc. No. 1975-20566W, Oct. 1974).*

Primary Examiner — Brieann R Fink
(74) Attorney, Agent, or Firm — TransPacific Law Group; Pavel I. Pogodin, Esq.

(57) ABSTRACT

Method for producing a nanocomposite material reinforced by unidirectionally oriented pre-dispersed alumina nanofibers. The process is suited for industrial-scale production of the nanocomposite materials. The nanocomposite production process involves, synthesis of unidirectionally oriented pre-dispersed alumina nanofibers, casting a mat of pre-dispersed nanofibers with a predetermined orientation in the atmosphere of air or other gas(es) by saturating the nanofibers with liquid polymer matrix. Polymer matrix may include thermosets or/and thermoplastics. The material forming the polymer matrix may be heated to its melting point temperature to transform it to liquid phase. After saturation, the polymer matrix is hardened by lowering its temperature or by means of exposing the polymer matrix to UV radiation, electron beam and/or chemical hardeners. The nanomaterial is composed of polymer composite with homogeneously dispersed uniformly oriented reinforcing nanofibers. Subsequently, the nanofibers in the nanocomposite are dispersed by means of subjecting to hydrodynamic stress, mechanical or/and ultrasound coarse dispersing.

20 Claims, 9 Drawing Sheets

(56) References Cited

U.S. PATENT DOCUMENTS

2004/0241609 A1* 12/2004 Jia et al. .................. 433/167
2005/0228073 A1* 10/2005 Nishio et al. ............. 523/200
2008/0164051 A1* 7/2008 Lee ..................... H01B 5/105
　　　　　　　　　　　　　　　　　　　　　174/131 A
2014/0316063 A1* 10/2014 Hochstetter ............ B29C 70/52
　　　　　　　　　　　　　　　　　　　　　524/607

* cited by examiner

METHOD AND APPARATUS FOR PRODUCING A NANOCOMPOSITE MATERIAL REINFORCED BY UNIDIRECTIONALLY ORIENTED PRE-DISPERSED ALUMINA NANOFIBERS

BACKGROUND OF THE INVENTION

1. Field of the Invention

This described embodiments relate in general to nano technology and, more specifically, to a method and apparatus for producing a nanocomposite material reinforced by unidirectionally oriented pre-dispersed alumina nanofibers.

2. Description of the Related Art

Nanotechnology deals with developing materials, devices, or other structures having at least one dimension sized between 1 and 100 nanometers. Nanoparticles are the particles having at least one dimension sized between 1 and 100 nanometers. On the other hand, nanofibers are defined as fibers with diameters less than 1000 nanometers. Nanofibers are widely used for manufacturing nanocomposite materials having enhanced properties, such as polymers reinforced by nanoparticles.

At the present time, several kinds of nanoparticles which can be used in the production of nanocomposites are known in the art, including, without limitation, carbon nano tubes (CNT), nano powders produced from silicon carbide, alumina and other materials. Also known in the art are various methods for nanoparticle or nanofiber fabrication, including, without limitation: hydrothermal process, sol gel process, mercury mediated process, flame-spray method, vapor-liquid-solid process as well as electrospinning method.

It should be noted that due to their large surface area, nanofibers such as carbon nanotubes tend to agglomerate during the production process of nanocomposite materials. On the other hand, in the agglomerated state, many of the beneficial properties of the nanofibers and, in particular, their reinforcing ability, are compromised. This leads to only marginal improvements in the properties of nanofiber-reinforced composites compared to the conventional materials.

To remediate the aforesaid agglomeration tendency of nanofibers and the associated degradation of material properties, various nanoparticle dispersion methods have been devised. Exemplary dispersion techniques include ultrasound-assisted dispersion described in U.S. Patent Application Publication No. US 20090275689 A1, incorporated by reference herein. Additional dispersion methods involve exposing the agglomerates forming during nanocomposite production to hydrodynamic stresses as described, for example in European Patent Publication No. EP1818358 A1, incorporated by reference herein.

An additional challenge facing the nanocomposite materials production is the difficulty in achieving a unidirectional alignment of reinforcing nanoparticles within the nanocomposite.

Thus, new and improved techniques for manufacturing of nanocomposite materials reinforced with unidirectionally aligned nanoparticles are needed.

SUMMARY OF THE INVENTION

The inventive methodology is directed to methods and systems that substantially obviate one or more of the above and other problems associated with conventional techniques for manufacturing nanocomposite materials.

In accordance with one aspect of the embodiments described herein there is provided a method for producing a nanocomposite polymeric material reinforced by co-oriented pre-dispersed alumina $Al_2O_3$ nanofibers, the method involving: saturating a structure of co-oriented pre-dispersed alumina $Al_2O_3$ nanofibers with a polymer matrix; and facilitating polymerization of the polymer matrix to produce the nanocomposite polymeric material.

In one or more embodiments, the polymer matrix is pre-heated to a melting point.

In one or more embodiments, facilitating polymerization comprises cooling of the polymer matrix.

In one or more embodiments, facilitating polymerization comprises exposing the polymer matrix to ultraviolet light and/or electron beam.

In one or more embodiments, facilitating polymerization comprises adding a chemical hardener to the polymer matrix.

In one or more embodiments, the method further comprises subjecting the nanocomposite polymeric material to an ultrasound to facilitate dispersion of the alumina $Al_2O_3$ nanofibers.

In one or more embodiments, the method further comprises subjecting the nanocomposite polymeric material to a hydrodynamic stress to facilitate dispersion of the alumina $Al_2O_3$ nanofibers.

In one or more embodiments, the polymerization of the polymer matrix is performed in an atmosphere of air.

In one or more embodiments, the structure of co-oriented alumina $Al_2O_3$ nanofibers comprises a plurality of co-oriented, pre-dispersed alumina $Al_2O_3$ nanofibers.

In one or more embodiments, the polymer matrix comprises thermosets or thermoplastics.

In accordance with another aspect of the embodiments described herein there is provided a nanocomposite polymeric material reinforced by co-oriented pre-dispersed alumina $Al_2O_3$ nanofibers prepared by a process involving: saturating a structure of co-oriented pre-dispersed alumina $Al_2O_3$ nanofibers with a polymer matrix; and facilitating polymerization of the polymer matrix to produce the nanocomposite polymeric material.

In one or more embodiments, the polymer matrix is pre-heated to a melting point.

In one or more embodiments, facilitating polymerization comprises cooling of the polymer matrix.

In one or more embodiments, facilitating polymerization comprises exposing the polymer matrix to ultraviolet light and/or electron beam.

In one or more embodiments, facilitating polymerization comprises adding a chemical hardener to the polymer matrix.

In one or more embodiments, the method further comprises subjecting the nanocomposite polymeric material to an ultrasound to facilitate dispersion of the alumina $Al_2O_3$ nanofibers.

In one or more embodiments, the method further comprises subjecting the nanocomposite polymeric material to a hydrodynamic stress or vacuum to facilitate dispersion of the alumina $Al_2O_3$ nanofibers.

In one or more embodiments, the polymerization of the polymer matrix is performed in an atmosphere of air.

In one or more embodiments, the structure of co-oriented alumina $Al_2O_3$ nanofibers comprises a plurality of co-oriented, pre-dispersed alumina $Al_2O_3$ nanofibers.

In one or more embodiments, the polymer matrix comprises thermosets or thermoplastics.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
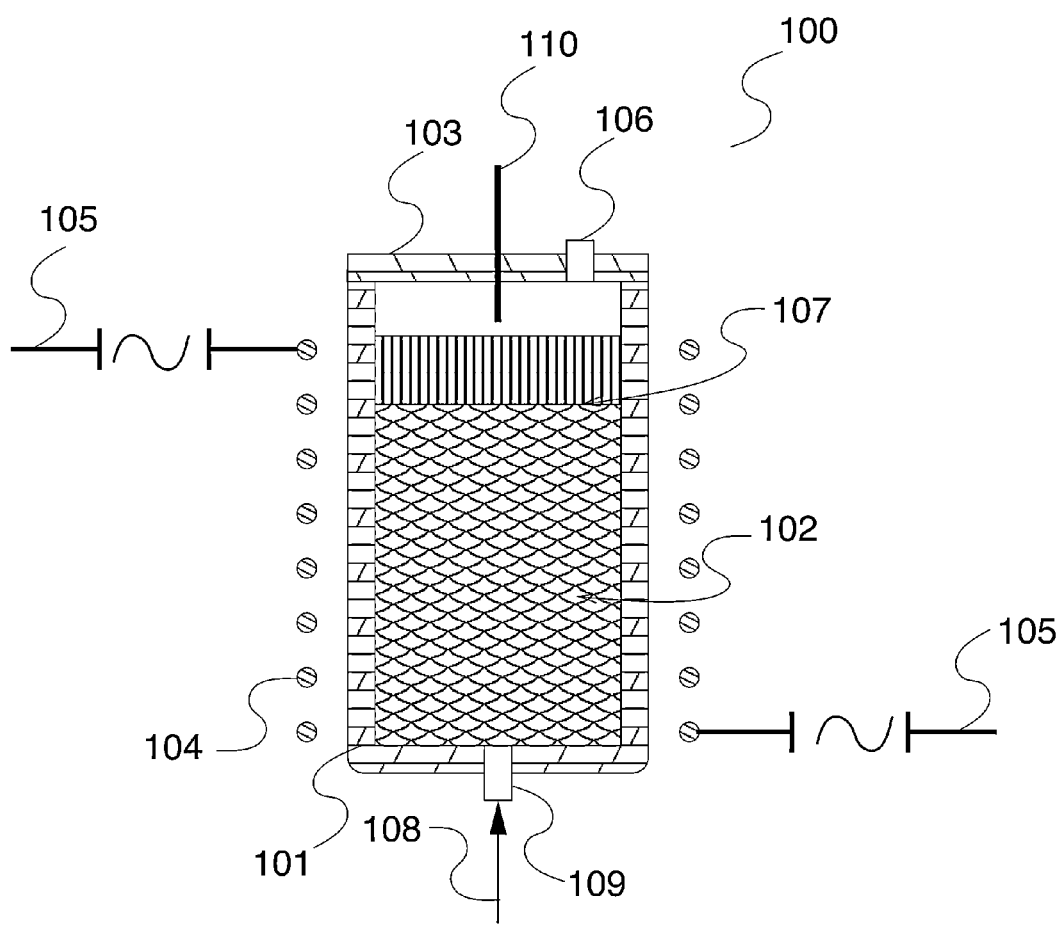
FIG. 1 illustrates an exemplary embodiment of a reactor for synthesis of aluminum oxide nanofibers.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the invention, there is provided a method and apparatus for producing a nanocomposite material reinforced by unidirectionally oriented pre-dispersed alumina nanofibers. The aforesaid process is well suited for industrial-scale production of the nanocomposite materials. In one or more embodiments, the nanocomposite production process involves casting a mat of pre-dispersed nanofibers with a predetermined orientation in the atmosphere of air or other gas(es) by saturating the nanofibers with a liquid polymer matrix. In one or more embodiments, the used polymer matrix may include, without limitation, thermosets or/and thermoplastics. The material forming the polymer matrix may be heated to its melting point temperature to transform it to a liquid phase. After saturation, the polymer matrix is hardened by lowering its temperature or by means of exposing the polymer matrix to ultra-violet radiation, electron beam and/or chemical hardeners.

The resulting nanomaterial is composed of the polymer composite with homogeneously dispersed uniformly oriented reinforcing nanofibers. Subsequently, the nanofibers in the nanocomposite are dispersed by means of subjecting to hydrodynamic stress, as described, for example in European Patent Publication No. EP1818358 A1. Additionally or alternatively, the nanocomposite may be subject to mechanical or/and ultrasound coarse dispersing. Finally, the resulting nanocomposite material is subjected to the conventional fabrication techniques to manufacture the final composite product.

In accordance with one or more embodiments of the invention, at the first step of the inventive process, polycrystalline alumina nanofibers are produced by controlled liquid phase oxidation of aluminum. In one or more embodiments, the alumina nanofibers synthesis method comprises two stages. During the first stage, various additives are introduced into molten metallic aluminum. During the second stage, the alumina nanofibers are synthesized from the resulting melt in the presence of oxygen. In one or more embodiments, the inventive method is performed in a reactor.

Subsequently, at the second process step, the manufactured alumina nanofibers are combinated with a polymer matrix. Upon drying, the resulting nanocomposite material reinforced by alumina nanofibers is produced. In one or more embodiments, the alumina nanofibers act to enhance mechanical, thermal, optical and electrical properties of the polymer base.

The aforesaid two steps of the inventive nanocomposite material synthesis process will now be described in detail. It should be noted that the below description primarily deals with alumina nanofibers possessing two linear dimensions of less than 45 nm. Because the nanofibers described herein have circular cross section, the size of the nanofiber will be specified below by reference to its diameter.

In accordance with one or more embodiments of the invention, the alumina nanaofibers are produced in a reactor. The aforesaid reactor is designed to provide the heating and enable melting of the aluminum. An exemplary embodiment of the reactor 100 is illustrated in FIG. 1. The shown embodiment of the reactor 100 incorporates reactor body 101 enclosing a reaction chamber, which contains the melt 102. The reactor 100 is closed from the top using cover 103, which may incorporate one or more sensor assembly 110 for monitoring various parameters inside the reactor 100, including, without limitation, temperature, pressure, humidity and oxygen content. The reactor cover 103 may also incorporate one or more valve assemblies 106 for controlling the atmosphere inside the reactor. In addition, an inlet 109 may be provided in the bottom part of the reactor 100 for injecting various additives and oxygen into the reactor 100, see numeral 108. In one or more embodiments, the content of the reactor may be heated using a suitable induction heating mechanism, which may incorporate induction coil 104 electrically connected to an electric current source 105. The zone of synthesis of aluminum oxide nanofibers is marked in Figure with numeral 107. The oxygen content inside the reactor 100 may be automatically monitored and/or altered using control logic.

In one or more embodiments, the reactor is designed to maintain a sustained temperature of between 660° C. and 1,000° C. When the additives described below are introduced into the molten aluminum, it is desirable to provide steady and uniform the stirring of the melt. To this end, the aforesaid reactor may be provided with a stirring mechanism (not shown in FIG. 1). The construction of the reactor should also provide control over gas composition of the atmosphere during both the introduction of the additives and during the synthesis of the nanofibers. In one or more embodiments, the oxygen content of the atmosphere should be 0.00001 wt. % (weight percent) to 99.9 wt. % depending on the stage of the synthesis process.

Figure 2:
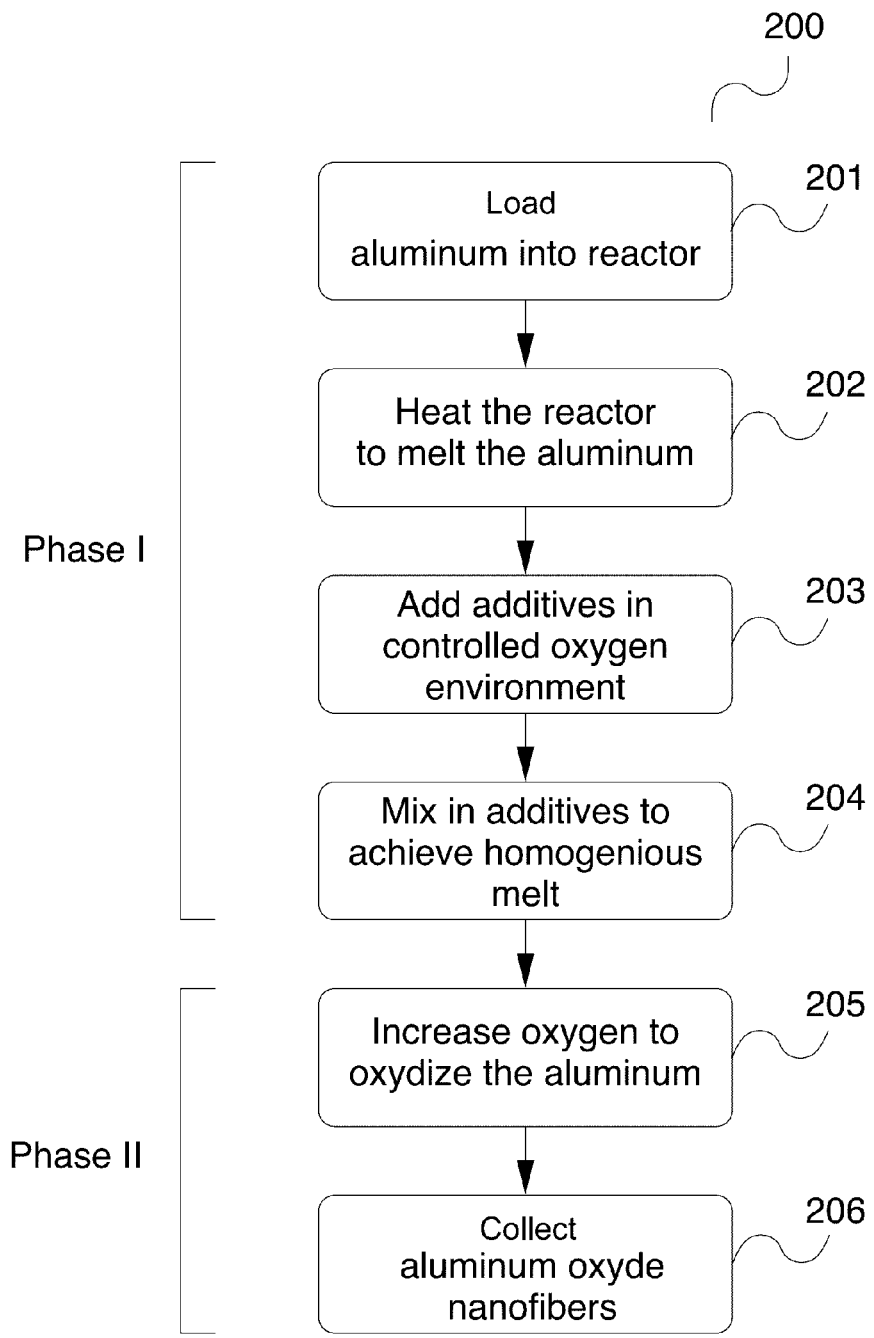
FIG. 2 illustrates an exemplary embodiment of a method for production of aluminum oxide nanofibers.

FIG. 2 illustrates an exemplary embodiment of the inventive method 200 for production of aluminum oxide nanofibers. In accordance with one or more embodiments of the invention, during the first, additive introduction phase (Phase I in FIG. 2) of the inventive process 200, the oxygen content of the atmosphere is kept to the minimal oxygen concentration. On the other hand, during the second, synthesis stage (Phase II in FIG. 2), the oxygen content should be higher, depending on the temperature and the required speed of the nanofiber synthesis process.

In accordance with one or more embodiments of the invention, the heating of the melt is performed using induction heating or electrical resistance heating (ERH, also known as electrical resistive heating) methods, which are well known to persons of ordinary skill in the art. To this end, the reactor may incorporate an appropriate heater. However, the present invention is not limited only to the aforesaid induction heating or electrical resistance heating methods and any other suitable heating method could be utilized for heating, melting and maintaining the required temperature of the material. It should be noted that the heater should preferably provide even heating of the entire volume of the material in the reactor. In addition, in one or more embodiment, the reactor incorporates means for controlling the content of the atmosphere inside the reactor. Construction and methods of application of such means are well known to persons of ordinary skill in the art.

In accordance with one or more embodiments of the invention, in order to synthesize alumina nanofibers, metallic aluminum having purity of 99.7% is first loaded into the reactor 100 in step 201 and melted in the reactor n step 202, see FIG. 2. It should be noted that it is also possible to use other grades of aluminum, as long as the chemical composition of the material described below is achieved. In accordance with one or more embodiments of the invention, the melt is subsequently heated to 900° C., and additives are introduced into the melt to achieve certain predetermined concentrations.

In accordance with one or more embodiments of the invention, the following additives are introduced into the heated melt in step 203 to achieve an additive concentration in the range indicated next to the respective additive:
  a. Iron (Fe) at concentration between 0.1 and 12 wt. %;
  b. Selenium (Se) at concentration between 0.1 and 12 wt. %;
  c. Tellurium (Te) at concentration between 0.1 and 12 wt. %; and
  d. Zirconium (Zr) at concentration between 0.1 and 12 wt. %.

In one or more embodiments, a. through d. above summed up represent less than 49 wt. % of the molten metallic aluminum, and all other elements (except for aluminum) together comprise less than 1 wt. % of the molten metallic aluminum.

In accordance with one or more embodiments of the invention, the aforesaid additives are introduced into the melt not in their pure form, but as part of compositions and/or alloys. This may facilitate the dissolution of the respective additives in the melt and result in a higher degree of homogeneity of the melt.

In one embodiment of the inventive technique, one or more of the aforesaid additives are introduced into the melt in a solid powder form. In an alternative embodiment, the additives may be introduced in a pre-melted form. To facilitate attaining the proper homogeneity of the resulting melt, in one or more embodiments, the stirring mechanism may be used in the reactor 100 to perform mixing in of the additives in step 204, see FIG. 2.

In accordance with one or more embodiments of the invention, once suitably homogeneous melt is obtained, oxygen is introduced into the melt or oxygen content is increased, see step 205. In one or more embodiments, oxygen is introduced through melt's surface by means of diffusion. In another embodiment, oxygen is injected into the melt using an injector. Finally, in an alternative embodiment, oxygen is introduced into the melt through introducing a composition or compositions of oxygen with one or more of the following chemical elements: Iron (Fe), Selenium (Se), Tellurium (Te) and Zirconium (Zr).

In accordance with one or more embodiments of the invention, oxygen is introduced up to a concentration of 5 wt. %. Once oxygen is introduced and reaches the indicated concentration, the synthesis of nanofibers takes place either on the surface of the melt or on a boundary between the molten aluminum and another medium. In one or more embodiments, the grown polycrystalline alumina $Al_2O_3$ nanofibers are harvested from the surface of the molten metallic aluminum or from the boundary of the molten metallic aluminum and another medium. In accordance with one or more embodiments of the invention, the synthesis of the polycrystalline alumina $Al_2O_3$ nanofibers is performed within temperature range of the molten metallic aluminum from 660° C. to 1000° C. Finally, the aluminum nanofibers are collected at step 206. In one or more embodiments, the aluminum nanofibers are synthesized in gamma phase. In various alternative embodiments, the alumina nanofibers may be synthesized in KsI (Xi) phase, Ksi (Xi) and Gamma mixed phase or other phases, depending on the specific parameters of the synthesis process.

In accordance with one or more embodiments of the invention, it order to insure continuous nanofiber synthesis process, it is desirable to provide a steady supply of oxygen to the reactor to maintain oxygen concentration within desired limits. In addition, the chemical composition of the melt and the temperature should also be appropriately maintained within proper limits during the synthesis process.

As the alumina nanofibers are formed on the surface of the melt during the synthesis process, they can be harvested from the melt's surface. The diameter of the produced nanofibers can be controlled through the parameters of the synthesis process, such as temperature and chemical composition of the melt. On the other hand, the length of the produced nanofibers is determined by synthesis time. In one or more embodiments, the nanofiber synthesis speed may vary from 0.1 cm/hour to 1 cm/hour. It should be noted that the described method may also be utilized to synthesize polycrystalline alumina nanofibers by changing the synthesis conditions during the synthesis process and/or by applying an external action on the surface of the molten aluminum.

Figure 5:
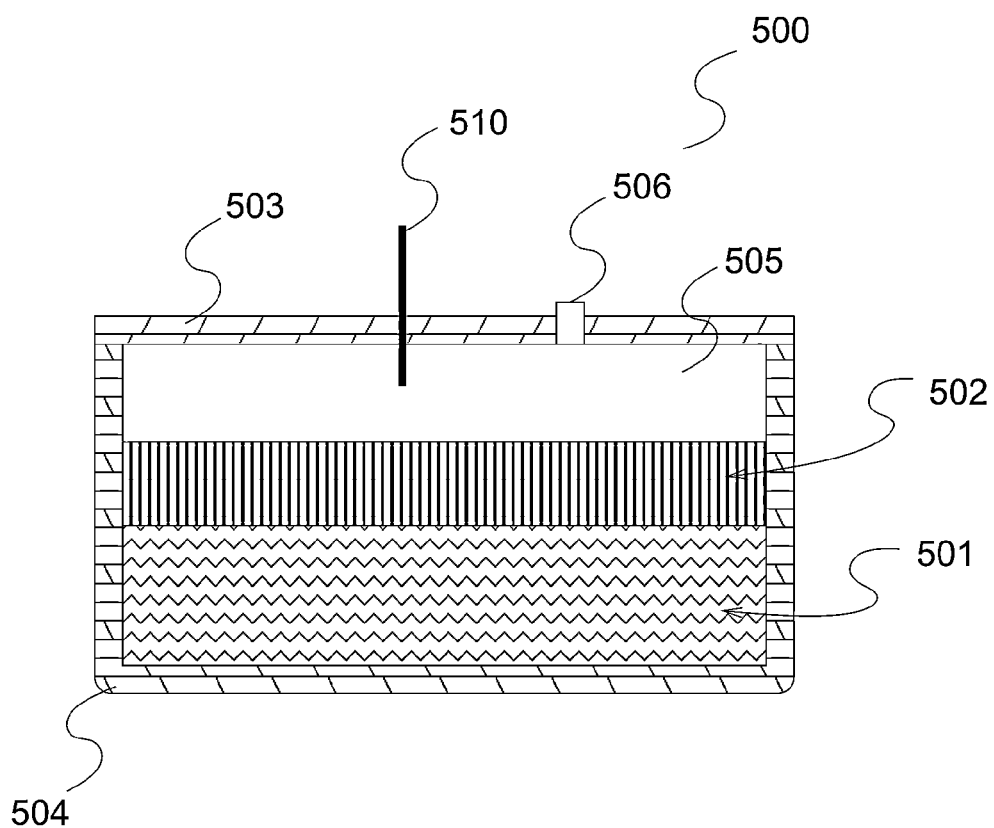
FIG. 5 illustrates an exemplary embodiment of a secondary reactors for producing alumina nanofibers having an increased surface area.

In one or more embodiments, to increase the production yield of aluminum nanofibers, after heating and adding the aforesaid additives, the aluminum melt may be transferred from the reactor 100 shown in FIG. 1 to one or more secondary reactors 500 having an increased surface area, as shown in FIG. 5. The aforesaid transfer of the melt may be performed in an atmosphere of noble gases. In an alternative embodiment, the melt transfer many be performed in oxygen-containing atmosphere. However, in this case, it is desirable to perform the transfer very quickly to prevent oxidation of the melt during the transfer. The aluminum oxide nanofibers 502 are produced in one or more secondary reactors 500 in oxygen-containing atmosphere 505 at an increased amount due to increased surface area of the melt 501. Similar to the reactor 100, in one or more embodiments, the secondary reactor 500 may include a reactor body 504, top cover 503, one or more sensor assemblies 510 and one or more valve assemblies 506, which may perform substantially the same functions as the corresponding elements of the reactor 100.

Figure 3:
FIGS. 3 and 4 illustrate a mat-like structure of the produced co-oriented pre-dispersed alumina nanofibers.
Figure 4:
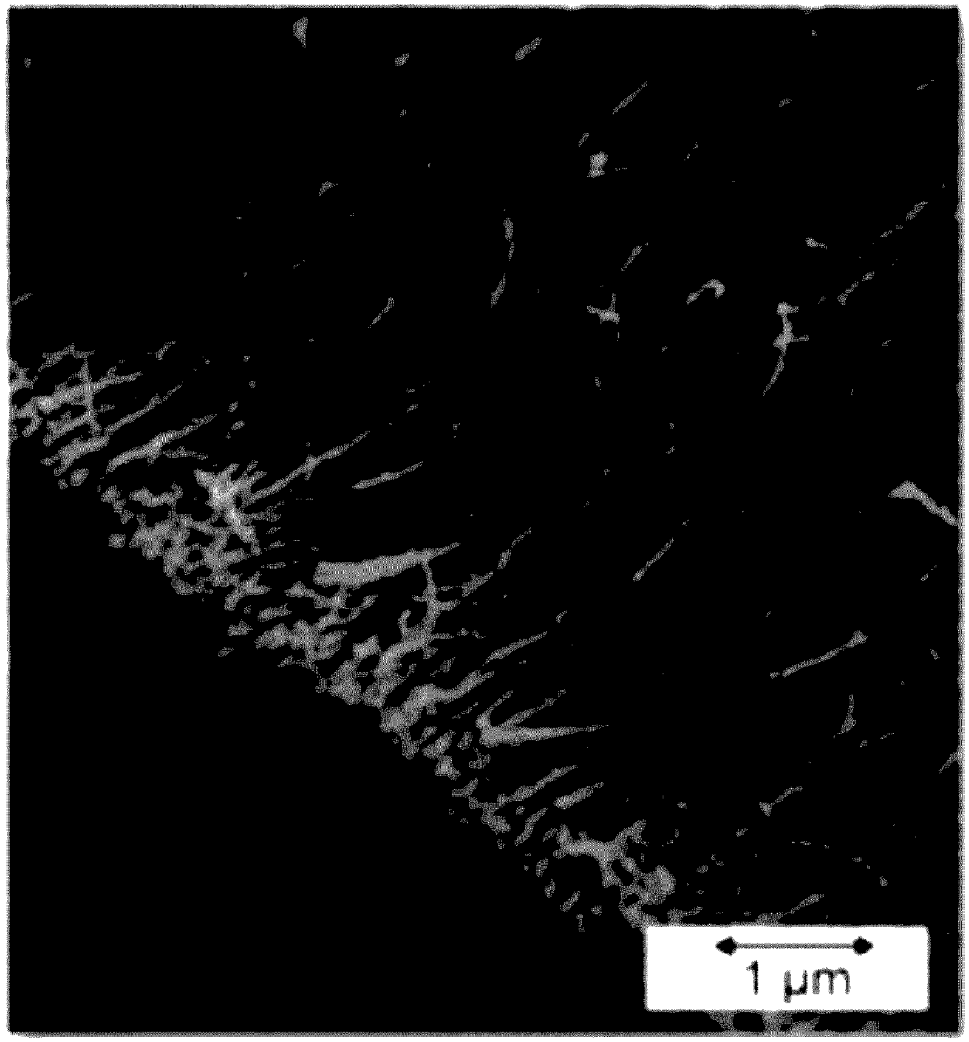

The alumina nanofibers produced according to techniques described above form a mat-like structure shown, for example, in FIGS. 3 and 4. In the aforesaid nanofiber structure, the alumina nanofibers are all oriented in the same transverse direction. Also, in the described structure, the nanfibers are pre-dispersed. In accordance with one or more embodiments, the pre-dispersed co-oriented alumina nanofibers are combined with polymer matrix using any well known to persons of ordinary skill in the art industrial processes, including, for example, the resin transfer molding (RTM) process. In alternative implementations, press moulding, transfer moulding, pultrusion moulding, filament winding, casting, centrifugal casting, continuous casting and slip forming may be additionally used.

In various embodiments, the composition of the nanofibers in the polymer matrix may range from above zero to 10 wt. %. In one or more embodiments, the composition ranged between 1 wt. % and 4 wt. %. In one or more embodiments, the polymer matrix comprises block copolymers, thermoplastics, liquid crystal polymers, thermosets, gel processed polymers and elastomers. In one or more embodiments, the polymer matrix is a transparent polymer matrix. In one or more embodiments, the alumina nanofibers are combined with the polymer matrix in a presence of water and/or other solvent(s). In one or more embodiments, the polymer matrix is selected from a group comprising: poly(meth)acrylate, polystyrene, polyester, polycarbonate, polyolefin, polyamide, polyurethane, polyacetal, polyvinyl acetal, polyvinyl ketal, vinyl polymer or copolymer comprising vinyl monomer selected from (meth)acrylate ester, aromatic vinyl, vinyl cyanide, vinyl halide and vinylidene halide; preferably it is selected from the group of polyalkylene terephthalate, polycarbonate of bisphenol compound, vinyl polymer or copolymer comprising vinyl monomer selected from methyl methacrylate, styrene and acrylonitrile and any combinations thereof. In one or more embodiment, the polymer matrix may comprise an epoxy-based polymer. During the production of the composite material, the polymer matrix is heated to its melting point.

To facilitate the polymerization process of the polymer matrix, the composite may be cooled down and the chemical hardeners may be added to the polymer matrix. Additionally or alternatively, the nanofiber structure with polymer matrix may be additionally exposed to ultraviolet radiation and/or electron beam (e-beam) radiation to further encourage the polymerization of the polymer matrix. Also additionally or alternatively, mechanical or/and ultrasound coarse dispersion may be performed using techniques described, for example, in the aforesaid U.S. Patent Application Publication No. US 20090275689 A1 and/or the aforesaid European Patent Publication No. EP1818358 A1.

Figure 6:
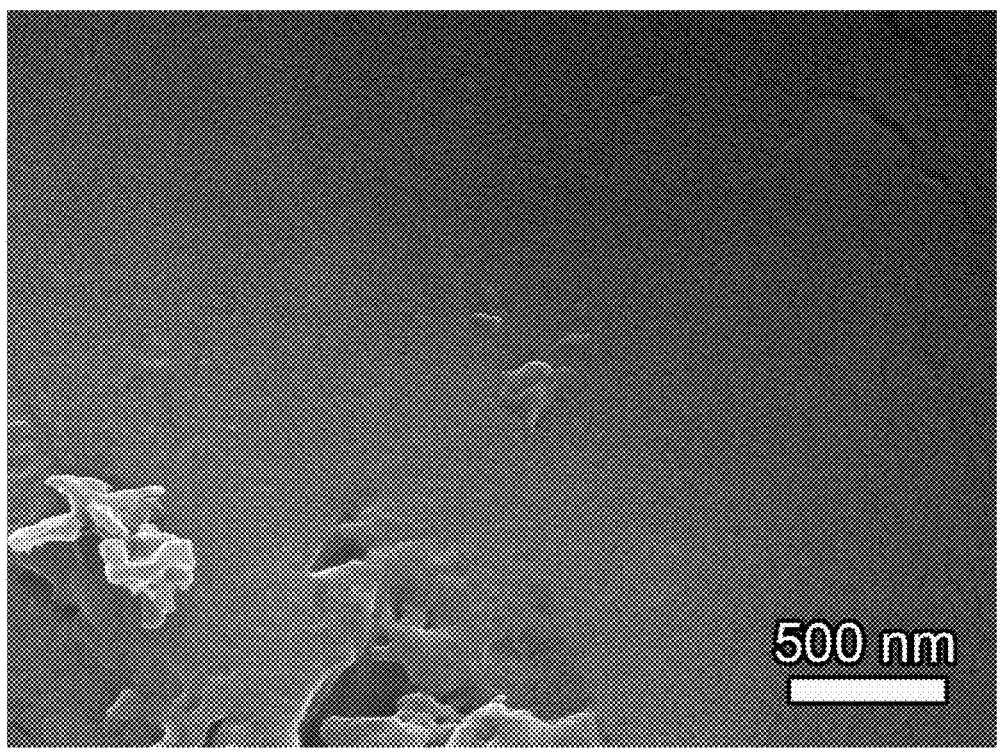
FIG. 6 illustrates a scanning electron microscope (SEM) image of the polymer matrix without reinforcing alumina nanofibers.
Figure 7:
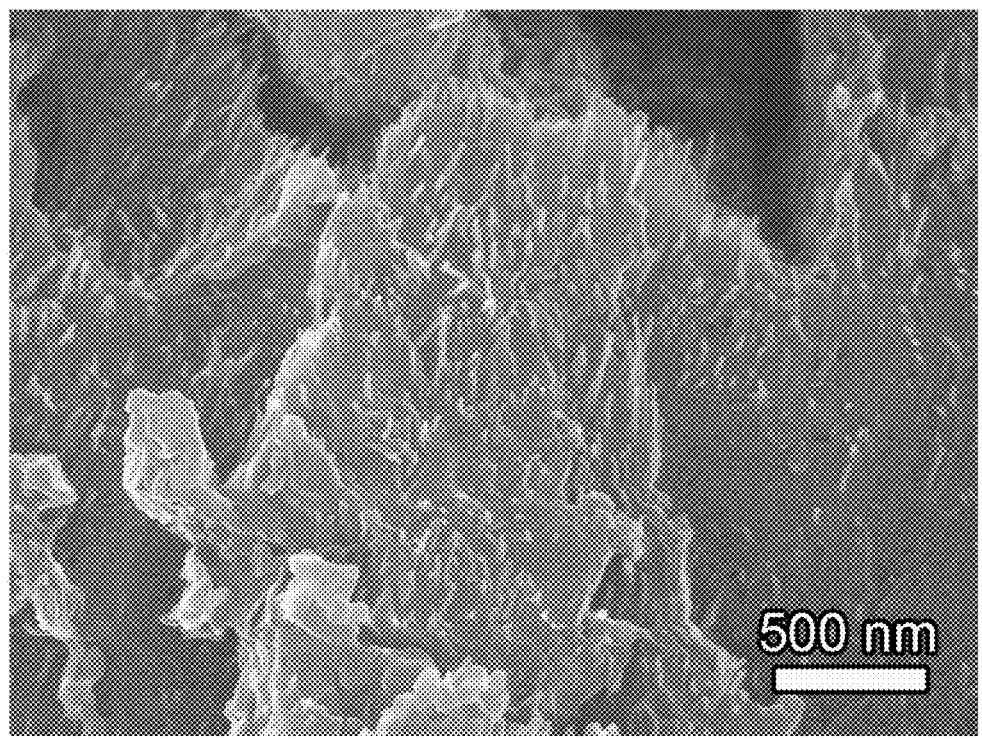
FIG. 7 shows a top-view SEM image of a composite material reinforced by the alumina nanofibers manufactured in accordance with techniques described above.
Figure 8:
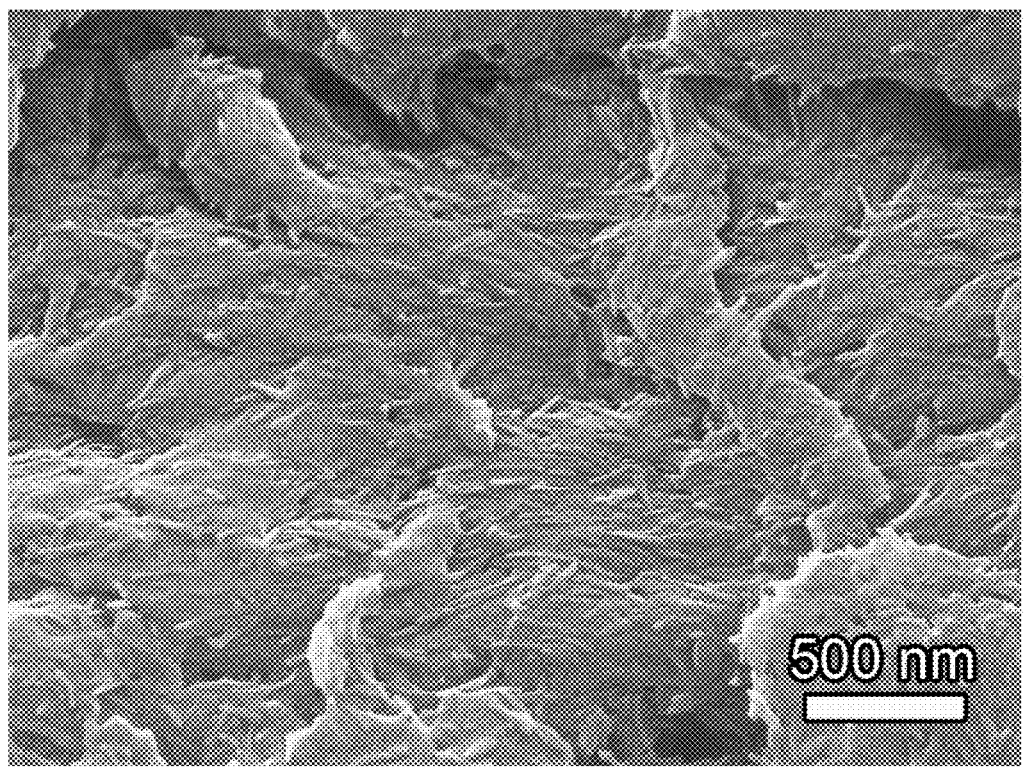
FIG. 8 shows a side-view SEM image of a composite material reinforced by alumina nanofibers.

FIG. 6 illustrates a scanning electron microscope (SEM) image of the polymer matrix without reinforcing alumina nanofibers. FIG. 7 shows a top-view SEM image of a composite material reinforced by the alumina nanofibers manufactured in accordance with techniques described above. FIG. 8 shows a side-view SEM image of a composite material reinforced by alumina nanofibers. In can be seen from FIGS. 7 and 8 that the alumina nanofibers in the composite material are predominantly well dispersed and spatially co-oriented without significant agglomeration effects present.

Figure 9:
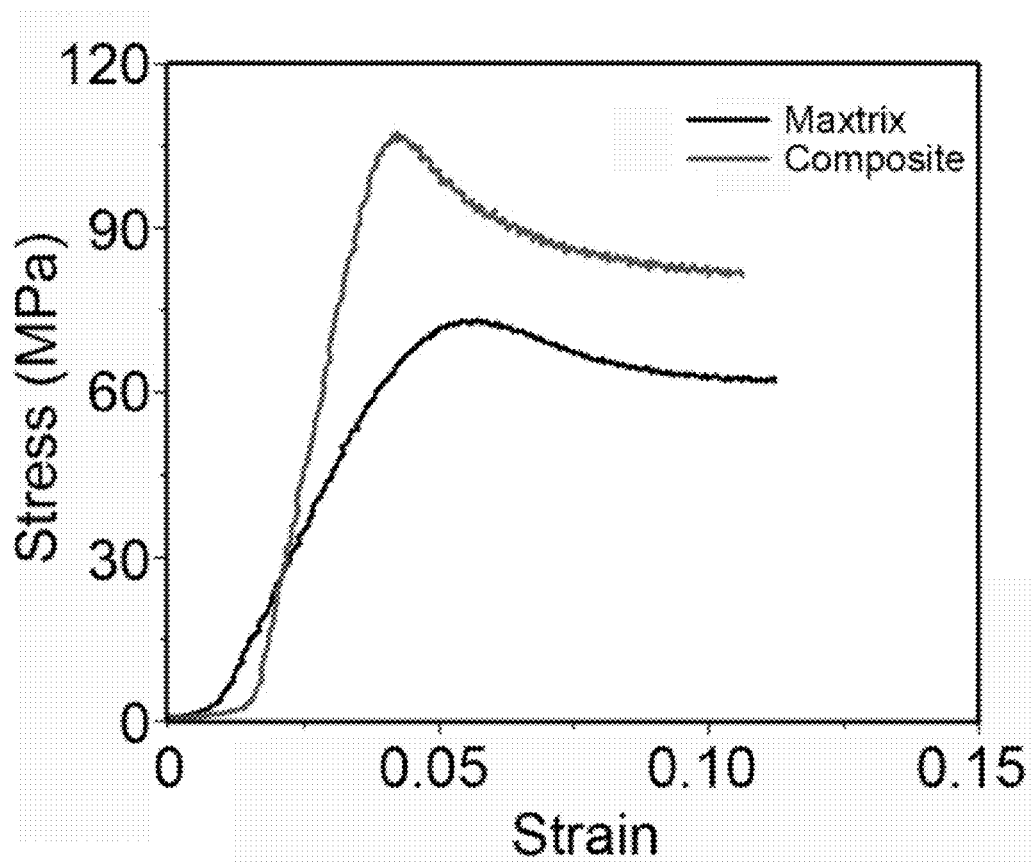
FIG. 9 illustrates exemplary results of a stress test performed on a composite material reinforced by oriented alumina nanofibers.

FIG. 9 illustrates exemplary results of a stress test performed on a composite material reinforced by oriented alumina nanofibers. Specifically, the comparison of the stress-strain curves of an epoxy matrix and the alumina nanofibers reinforced composite are shown. As can be seen from FIG. 9, the elastic (tensile) modulus of matrix and composite reinforced by alumina nanofibers is 2.05 GPa and 4.54 GPa, respectively, with the nanofiber-reinforced composite showing 120% improvement over the polymer matrix. The ultimate (tensile) strength of epoxy matrix and composite is 73.28 MPa and 107.50 MPa, respectively, with the nanofiber-reinforced composite demonstrating 47% increase in ultimate strength.

It should be noted that, other implementations of the invention will be apparent to those skilled in the art from consideration of the specification and practice of the invention disclosed herein. Various aspects and/or components of the described embodiments may be used singly or in any combination in the process for manufacturing nanocomposite materials. It is intended that the specification and examples be considered as exemplary only, with a true scope and spirit of the invention being indicated by the following claims.

What is claimed is:

1. A method for producing a nanocomposite polymeric material reinforced by unidirectionally oriented alumina $Al_2O_3$ nanofibers, the method comprising:
    a. saturating a structure of unidirectionally oriented pre-dispersed alumina $Al_2O_3$ nanofibers with two linear dimensions of less than 45 nm with a polymer matrix, wherein composition of the alumina $Al_2O_3$ nanofibers in the polymer matrix is between above zero wt. % and 10 wt. %; and
    b. facilitating polymerization of the polymer matrix to produce the nanocomposite polymeric material.

2. The method of claim 1, wherein in method step (a) the polymer matrix is pre-heated to a melting point.

3. The method of claim 1, wherein method step (b) comprises cooling of the polymer matrix.

4. The method of claim 1, wherein method step (b) comprises exposing the polymer matrix to ultraviolet light or electron beam.

5. The method of claim 1, wherein method step (b) comprises adding a chemical hardener to the polymer matrix.

6. The method of claim 1, further comprising subjecting the nanocomposite polymeric material to an ultrasound to facilitate dispersion of the alumina $Al_2O_3$ nanofibers.

7. The method of claim 1, further comprising subjecting the nanocomposite polymeric material to a hydrodynamic stress to facilitate dispersion of the alumina $Al_2O_3$ nanofibers.

8. The method of claim 1, wherein method step (b) is performed in an atmosphere of air.

9. The method of claim 1, wherein the structure of unidirectionally oriented alumina $Al_2O_3$ nanofibers comprises a plurality of unidirectionally oriented, pre-dispersed alumina $Al_2O_3$ nanofibers.

10. The method of claim 1, wherein the polymer matrix comprises thermosets or thermoplastics.

11. A nanocomposite polymeric material reinforced by unidirectionally oriented alumina $Al_2O_3$ nanofibers prepared by a process comprising:
   a. saturating a structure of unidirectionally oriented pre-dispersed alumina $Al_2O_3$ nanofibers with two linear dimensions of less than 45 nm with a polymer matrix, wherein composition of the alumina $Al_2O_3$ nanofibers in the polymer matrix is between above zero wt. % and 10 wt. %; and
   b. facilitating polymerization of the polymer matrix to produce the nanocomposite polymeric material.

12. The nanocomposite polymeric material of claim 11, wherein in method step (a) the polymer matrix is pre-heated to a melting point.

13. The nanocomposite polymeric material of claim 11, wherein method step (b) comprises cooling of the polymer matrix.

14. The nanocomposite polymeric material of claim 11, wherein method step (b) comprises exposing the polymer matrix to an ultraviolet light or an electron beam radiation.

15. The nanocomposite polymeric material of claim 11, wherein method step (b) comprises adding a chemical hardener to the polymer matrix.

16. The nanocomposite polymeric material of claim 11, wherein the method further comprises subjecting the nanocomposite polymeric material to an ultrasound to facilitate dispersion of the alumina $Al_2O_3$ nanofibers.

17. The nanocomposite polymeric material of claim 11, wherein the method further comprises subjecting the nanocomposite polymeric material to a hydrodynamic stress to facilitate dispersion of the alumina $Al_2O_3$ nanofibers.

18. The nanocomposite polymeric material of claim 11, wherein method step (b) is performed in an atmosphere of air.

19. The nanocomposite polymeric material of claim 11, wherein the structure of unidirectionally oriented alumina $Al_2O_3$ nanofibers comprises a plurality of unidirectionally oriented, pre-dispersed alumina $Al_2O_3$ nanofibers.

20. The nanocomposite polymeric material of claim 11, wherein the polymer matrix comprises thermosets or thermoplastics.

* * * * *